United States Patent
Griessbach et al.

(10) Patent No.: US 6,320,685 B1
(45) Date of Patent: Nov. 20, 2001

(54) DATA BUS FOR VEHICLES WITH A PLURALITY OF SUBSCRIBERS

(75) Inventors: Robert Griessbach, Weyarn; Peter Bachmaier, Fahrenzhausen, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/060,962

(22) Filed: Apr. 16, 1998

(30) Foreign Application Priority Data

Apr. 16, 1997 (DE) .............................................. 197 15 810

(51) Int. Cl.⁷ ............................ H04B 10/00; H04B 10/02
(52) U.S. Cl. ......................... 359/143; 359/147; 359/158; 359/177
(58) Field of Search ................................. 359/142, 143, 359/147, 148, 158, 177; 375/257

(56) References Cited

U.S. PATENT DOCUMENTS

| | | | |
|---|---|---|---|
| 4,561,091 | 12/1985 | Scholl et al. ........................... | 370/85 |
| 4,617,565 | * 10/1986 | Nakata et al. ..................... | 340/825.5 |
| 4,700,344 | 10/1987 | Kaino et al. ............................. | 370/94 |
| 4,942,571 | 7/1990 | Möller et al. ....................... | 370/85.1 |
| 5,515,361 | 5/1996 | Li et al. ................................. | 370/15 |

FOREIGN PATENT DOCUMENTS 0 580 016    1/1994    (EP) .

* cited by examiner

*Primary Examiner*—Leslie Pascal
*Assistant Examiner*—M. R. Sedighian
(74) *Attorney, Agent, or Firm*—Crowell & Moring LLP

(57) ABSTRACT

In a data bus for vehicles with a plurality of subscribers, said subscribers operating through peripheral S/E modules and an optical transmission line on a central bus, said bus having associated S/E bus modules connected to one another, said modules receiving a light signal emitted by a peripheral S/E module and passing it as a control signal to the other S/E bus modules and through these modules as a light signal to the corresponding peripheral S/E modules, the S/E bus modules switch off the corresponding peripheral S/E module when they receive a light signal over the transmission line that is longer than the maximum admissible signal length.

5 Claims, 4 Drawing Sheets

DATA BUS FOR VEHICLES WITH A PLURALITY OF SUBSCRIBERS

BACKGROUND AND SUMMARY OF THE INVENTION

This application claims the priority of German patent document PA 19715810, filed Apr. 16, 1997, the disclosure of which is expressly incorporated by reference herein.

The invention relates to a data bus for a vehicle having a plurality of subscribers which operate through peripheral S/E modules and an optical transmission line on a central bus, which has associated S/E modules which are connected to one another.

In a data bus of this kind, the peripheral S/E modules may emit a continuous light signal due to an external influence such as an accident, or due to an internal error. However, the S/E bus modules possess a low level of intelligence, merely converting the light signal entering from the peripheral module into a corresponding electrical or optical control signal, passing it on to the other bus modules. Therefore, such an anomaly results in a complete blockage of the data bus, in which all of the bus modules receive a continuous control signal. Since the bus modules and the peripheral modules do not differ from one another in their basic design, they shut off the input connected to the corresponding bus module, and the bus is then no longer operable.

The object of the invention is to provide a data bus of the type recited at the outset that remains operable at least to a limited degree in case of error.

This and other objects and advantages are achieved by the bus arrangement according to the invention, which monitors light signals transmitted via the bus, and when an S/E bus module receives a light signal which is longer than a maximum permissible signal length, the respective S/E bus module shuts off the corresponding peripheral S/E module. The entire data bus, except for this peripheral S/E module, then remains operable.

Since the S/E bus modules, as stated above, pass the incoming continuous light signal to their peripheral S/E modules as a continuous light signal, it may happen, due to component tolerances, that a peripheral S/E module that is intact shuts off before the source of the problem (a defective peripheral S/E module) can be shut off by the associated bus module. In order to restore the operability of the bus at least to the extent possible in this case, (that is, to shut off permanently only the defective peripheral S/E module), a routine for switching the intact peripheral S/E modules on again can be provided.

For this purpose, a bus master can be provided within the bus system which emits synchronization pulses at regular intervals. (The function of the bus master may be performed by a separate component or by an S/E bus module, for example.) The defective peripheral S/E module remains shut off for as long as it continues to emit a continuous light signal, while the other S/E modules are switched on again when they receive a synchronization pulse.

In this case, neither a light signal nor a control signal is applied for a time that is longer than the maximum permissible signal length. This activation can also be triggered automatically by internal logic provided in the S/E bus module. Operation can thus be resumed when the problem in the S/E module itself has been corrected and the module no longer emits a continuous light signal, or when the problem in another S/E module has been eliminated and a corresponding S/E bus module no longer receives a continuous control signal. In this way, assurance is provided that the bus is reactivated at least to the extent possible. This reactivation is always limited to the ranges that are functional.

Other objects, advantages and novel features of the present invention will become apparent from the following detailed description of the invention when considered in conjunction with the accompanying drawings.

DETAILED DESCRIPTION OF THE DRAWINGS

Figure 1:
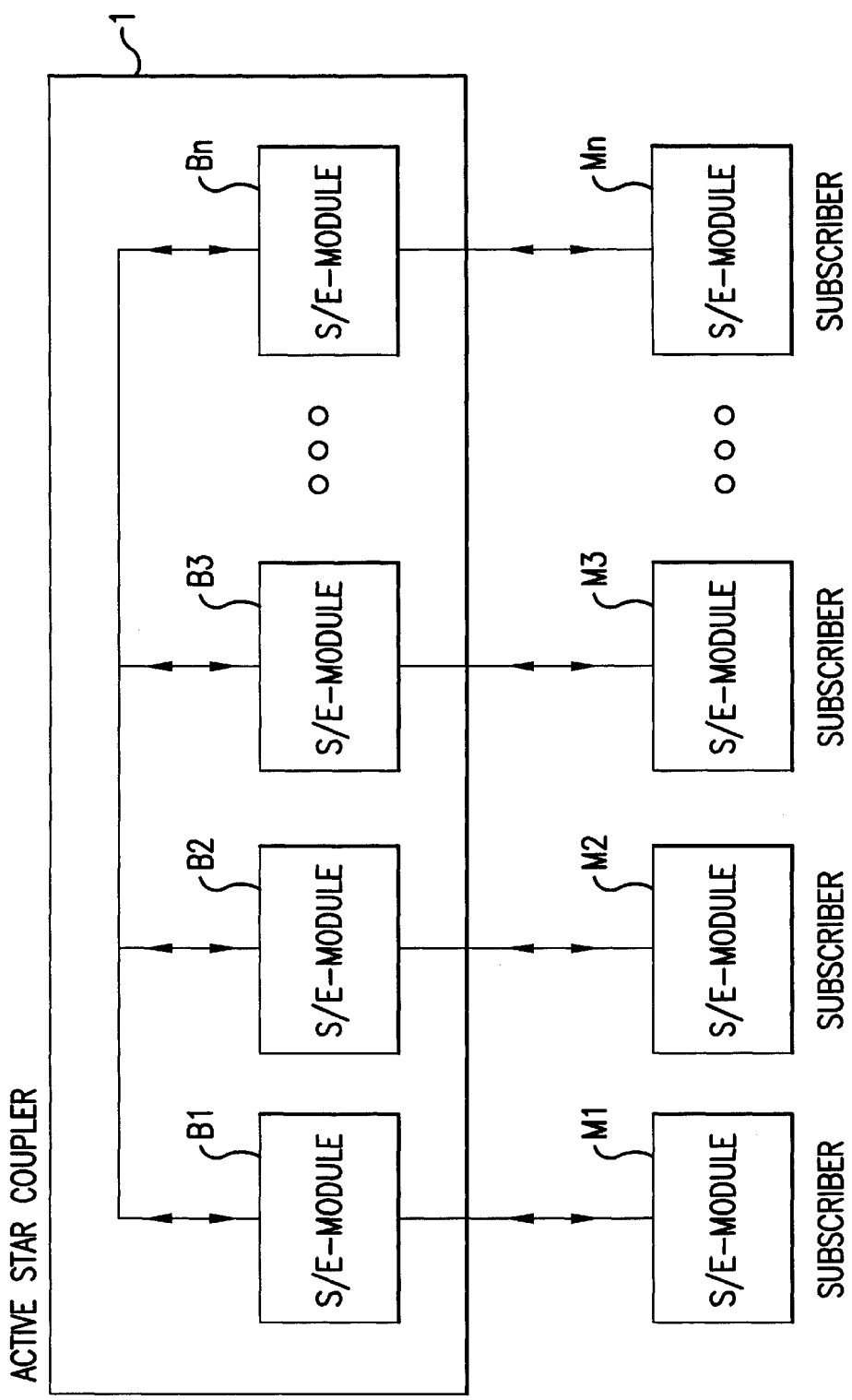
FIG. 1 is a schematic diagram of a data bus according to the invention.
Figure 2:
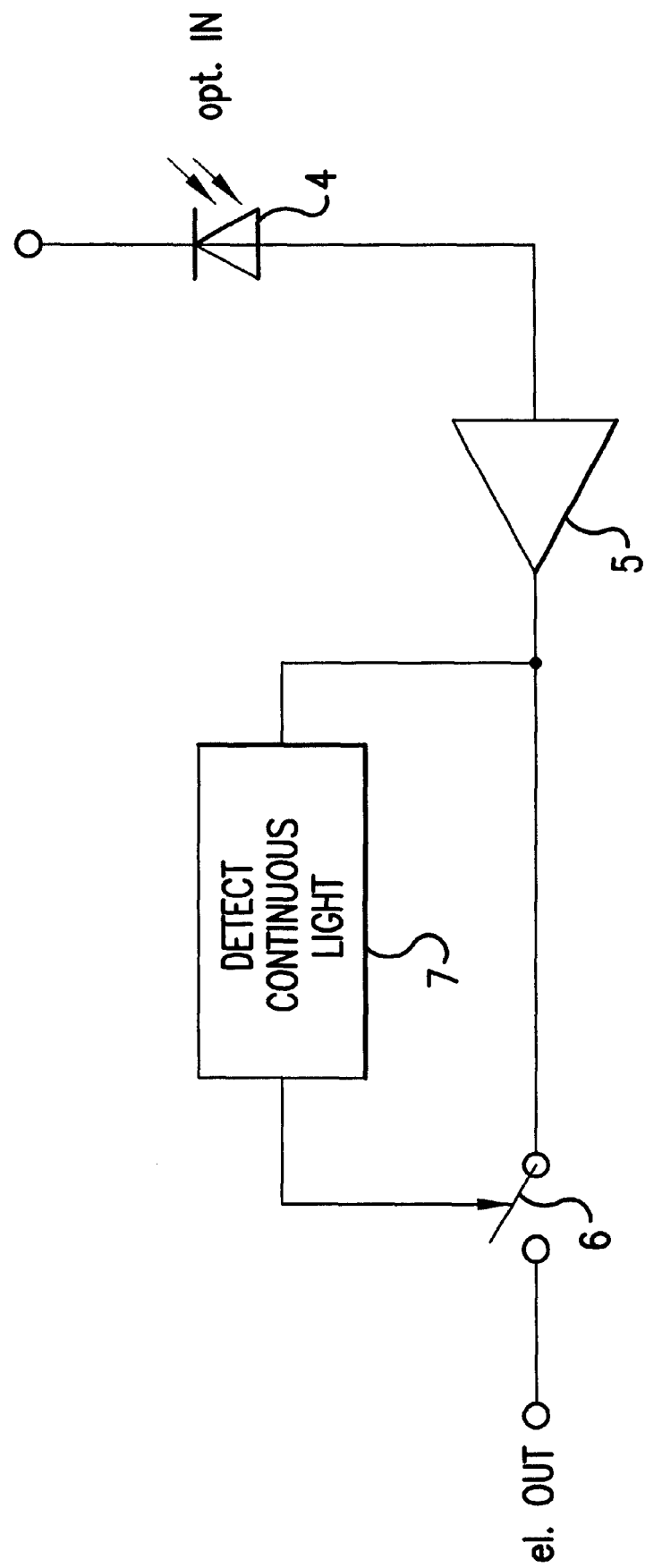
FIG. 2 shows a detail of i.f. modules in the data bus of FIG. 1.

The data bus shown in FIG. 1 has a series of S/E bus modules B1, B2, . . . Bn connected to one another in an active star coupler 1. Each of the bus modules is associated with a peripheral S/E module M1, M2, . . . Mn through which subscribers 1, 2, 3, . . . not shown in detail can exchange information with one another. The bus modules B1, B2, B3, . . . and the peripheral modules M1, M2, . . . are basically of the same design. As shown in FIG. 2 on the receiving side, these parts, called i.f. modules, essentially consist of an optoelectronic converter 4, an amplifier 5, and a switch 6 controlled by a monitoring circuit 7. Monitoring circuit 7 becomes active when a constant dominant level, in this case an electrical level, is applied. If such a level is detected, the output of the module is shut off by switch 6. This case (dominant continuous level) occurs for example when a peripheral S/E module M1, . . . Mn is damaged and thus transmits a continuous light signal to the corresponding bus module. This continuous light signal then causes the bus module to shut off its output, thus breaking the electrical connection to the other bus modules.

The essential components of the output branch of the module (not shown) include a conventional electrical/optical converter that changes the incoming electrical signal into a corresponding optical signal. If a malfunction such as described above then occurs, the corresponding bus module that is addressed supplies an electrical control signal at a constant level to the other bus modules, which convert it into a continuous light signal and supply it to their connected peripheral S/E modules.

It is possible that the S/E peripheral modules will switch off their outputs one after the other, thus interrupting the connections to their subscribers even before the problem has been corrected (i.e., the defective S/E module has been shut off), even though these S/E peripheral modules are intact. In order to reactivate the intact S/E modules in this case, each bus module can be designed so that if it no longer receives a continuous light signal at its receiver 4, it can be reactivated automatically. A critical aspect in this regard is a period of time within which no dominant light level is present. This is recorded by monitoring circuit 7. Then there is no longer any continuous electrical level. The monitoring circuit closes switch 6 again. The module can then operate without limit.

Figure 3A:
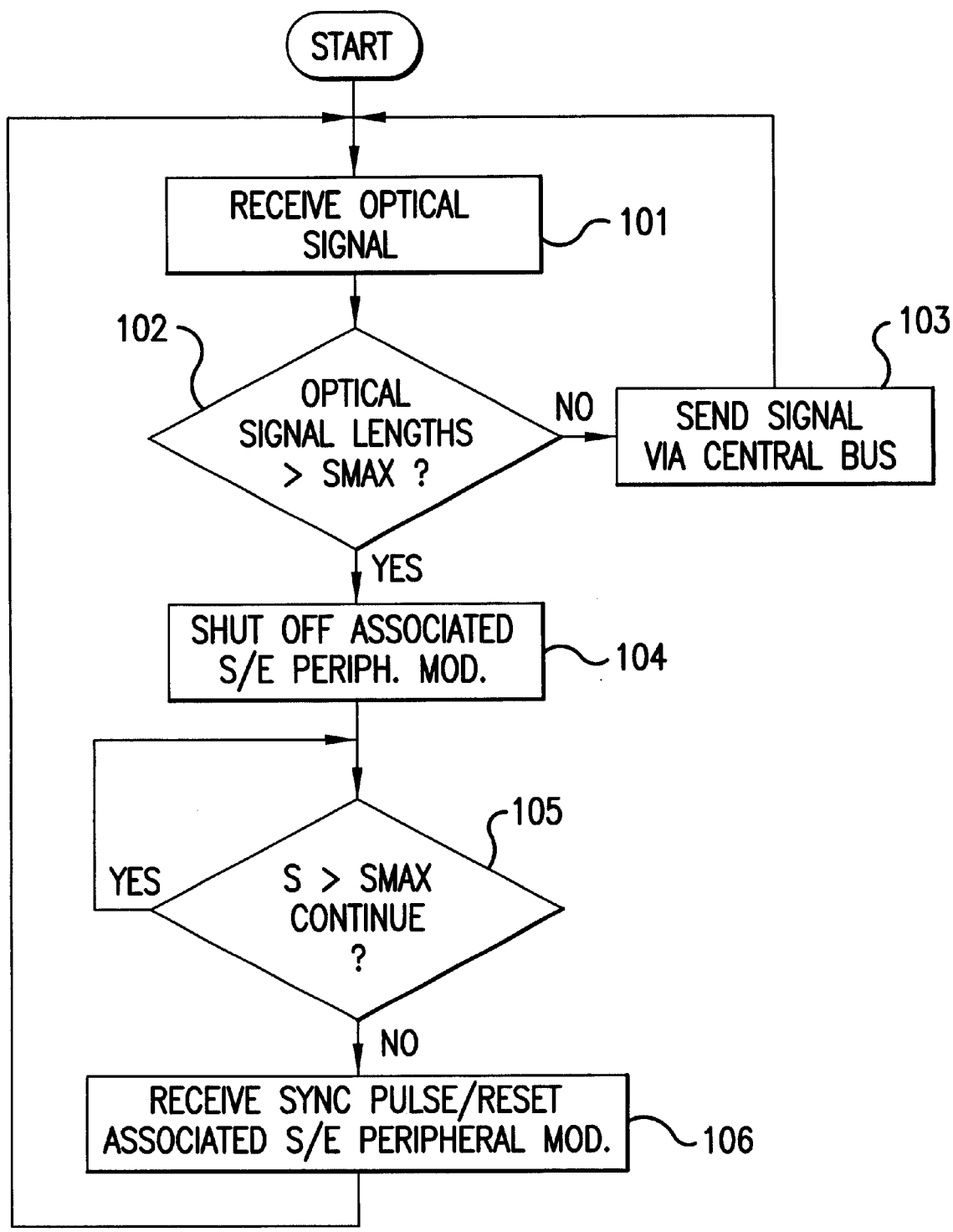
FIGS. 3A and B are flow charts which illustrate the operation of the data bus according to the invention.

FIG. 3A is a flow chart which illustrates the operation of the bus system according to the invention. In step 101, an optical signal is received by an S/E bus monitor. In step 102, a determination is made as to whether the length of the optical signal S exceeds a predetermined maximum permissible signal length $S_{max}$. If not (and the system is thus operating normally), in step 103, the signal is forwarded to the associated S/E peripheral module in the normal manner. If, however, in step 102 the optical signal length is greater than $S_{max}$, then the S/E bus module shuts off the associated S/E peripheral module in step 104. Thereafter, the associated S/E peripheral module remains shut off until the signal $S > S_{max}$ is no longer present in step 105. Thereafter, the receipt of a sync pulse in step 106 causes the associated S/E peripheral module to be reset, and processing and control proceeds in a normal manner.

Figure 3B:
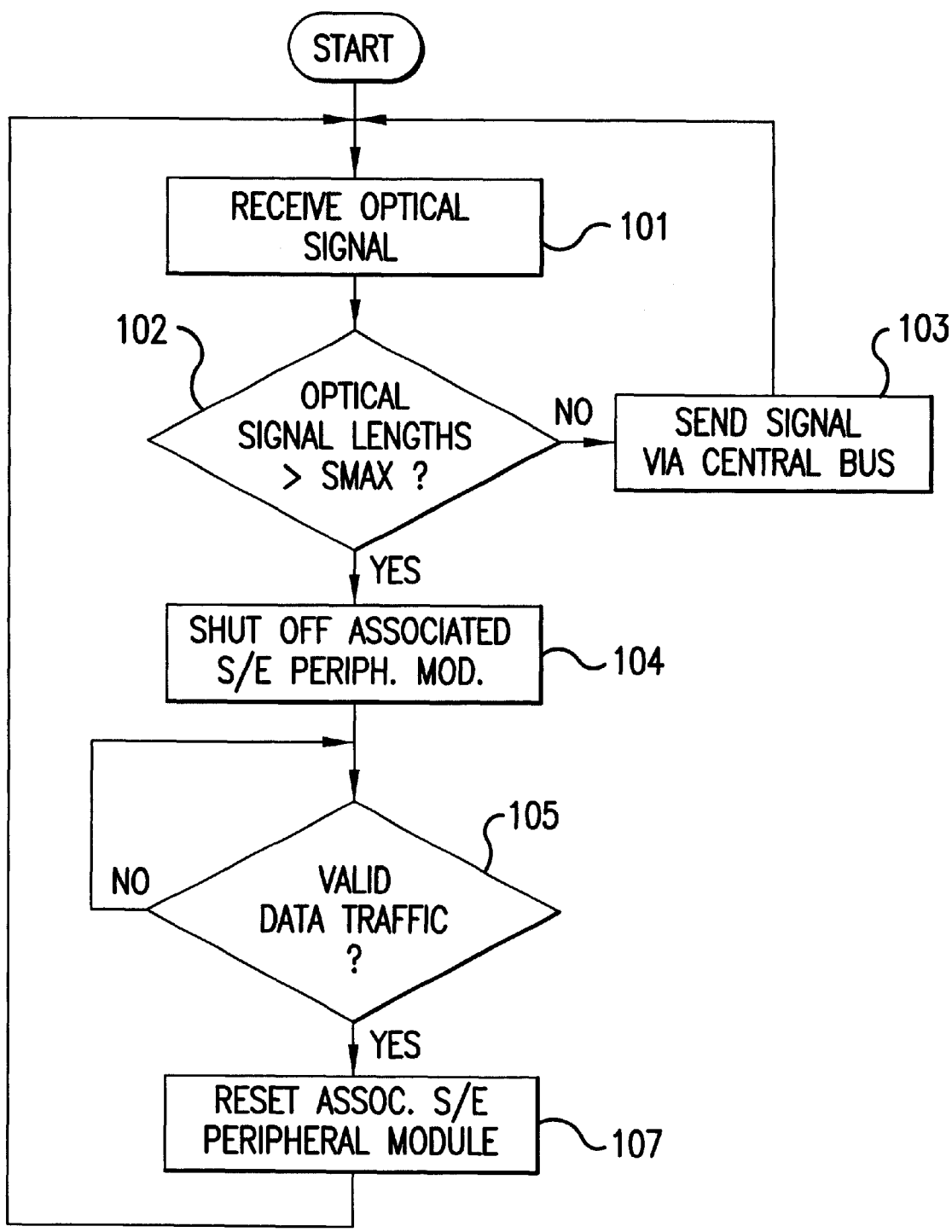

The embodiment of FIG. 3B is similar to that of FIG. 3A, except that in step 107, the associated S/E peripheral module is reset automatically whenever valid telegram traffic is detected on the data bus. This can be a synchronization pulse that is output by a bus master or even by another S/E bus module. Thus, with the exception of the defective S/E module, the entire system is then operable without limit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Data bus communication system for a vehicle with a plurality of subscribers, each subscriber operating through an S/E peripheral module via an optical transmission pathway, said data bus system comprising:
   a central bus; and
   a plurality of associated S/E bus modules connected with one another via the central bus, which S/E bus modules are adapted to receive a light signal communicated by a peripheral S/E module and pass it as a control signal to other S/E bus modules, and through said other S/E bus modules as a light signal to associated peripheral S/E modules;
   wherein the S/E bus modules shut off communication from the corresponding peripheral S/E module when they receive a light signal over the transmission pathway whose length is greater than a maximum admissible signal length.

2. Data bus according to claim 1, wherein the central bus has a bus master which emits synchronization pulses at regular intervals.

3. Data bus according to claim 1 wherein the S/E bus modules detect when they no longer receive light signals longer than the maximum admissible signal length, and reactivate communication from S/E peripheral modules associated therewith.

4. A control system for controlling a plurality of peripheral systems on board a vehicle, comprising:
   a plurality of S/E peripheral modules, each coupled to control a respective peripheral system;
   a central bus having a transmission medium coupling a plurality of S/E bus modules, each bus module being coupled to an associated S/E peripheral module for receiving a light signal communicated thereby and passing it via said transmission medium to other S/E bus modules as a control signal to S/E peripheral modules associated therewith; and
   means for causing an S/E bus module to disable communication from an S/E peripheral module associated therewith when said S/E peripheral module generates a light signal that exceeds a predetermined length.

5. A method of operating a data bus system for a vehicle having a plurality of S/E peripheral modules, each coupled to control a respective peripheral system; a central bus having a transmission medium coupling a plurality of S/E bus modules, each bus module being coupled to an associated S/E peripheral module for receiving a light signal communicated thereby and passing it via said transmission medium to other S/E bus modules as a control signal to S/E peripheral modules associated therewith, said method comprising:
   detecting length of light signals received by S/E bus modules;
   upon receipt by an S/E bus module of a light signal which exceeds a predetermined length, said S/E bus module shutting down communication from an S/E peripheral module associated therewith.

* * * * *